Sept. 11, 1928.  W. BUEL  1,683,654

GRAVE COVER

Filed Aug. 22, 1925

INVENTOR
Walter Buel
By W. L. Dempsey
ATTORNEY

Patented Sept. 11, 1928.

1,683,654

UNITED STATES PATENT OFFICE.

WALTER BUEL, OF ST. LOUIS, MISSOURI.

GRAVE COVER.

Application filed August 22, 1925. Serial No. 51,828.

My invention relates to covers for graves and specifically to a cover adapted to preserve at all times the original contour of the grave and prevent the growth of weeds and other vegetation directly above the grave.

The object of my invention is to provide a grave cover that will effectively preserve at all times its original contour irrespective of the freezing and thawing of the ground.

Another object of my invention is to provide a grave cover that will successfully prevent the growth of weeds and other vegetation above the grave and at the same time provide a suitable base for securely holding an urn or flower pot in place.

A further object of my invention is to provide a grave cover that has an opening where flowers or shrubbery may be planted, so that their growth will be confined to a single area, and the balance of the grave will be protected by the cover against the growth of weeds and other vegetation.

Another object of my invention is to provide means by which the grave cover may be readily adjusted and maintained in a horizontal position indefinitely.

Other and further objects and advantages of my invention will be apparent from the specification and claim, and are, also, illustrated by the drawings, in which:

The problem of taking care of a grave from year to year so that it will present an attractive and well kept appearance is attended with many difficulties, among which is the perennial growth of weeds and other vegetation, or the settling or sinking of the ground.

Attempts to overcome these difficulties have been made by the use of marble or granite slabs placed horizontally upon the top of the grave. In climates subject to wide variations of temperature or heavy rainfall, either the rain causes the grave to settle with the consequent tilting of the slabs from a horizontal position, or the freezing and thawing of the ground has disarranged, and in most cases, shifted the slabs from their original position.

Another objection to the marble slabs is that they are quite expensive and become disclored with age.

In order to overcome the difficulties above set forth, I have devised a cover which may be made of sheet metal in a variety of ornamental designs and which may be securely connected to a plurality of posts which can be set into the ground at a depth below the freezing line, hence the grave cover remains horizontal permanently exactly in its original plane, while at the same time it effectively prevents the growth of weeds or other vegetation immediately above the grave.

But, owing to the vicissitudes of fortune, it often happens that the care of graves of deceased relatives become such a financial burden that they are often neglected which, also, frequently occurs when the immediate relatives of the deceased move to considerable distances from their original place of abode, when it becomes necessary for them to delegate the care of the family grave into the hands of persons having no sentimental interest therein, so that even when the duty of taking care of the graves is transferred to others, they do not give them the careful attention they should commensurate with the financial considerations paid them.

In my preferred method of construction, I use either sheet metal stamped in a variety of ornamental designs, or cast iron. In either case an outer coating of delf or granite enamel is applied at high temperature by means of which a permanent coating is obtained that is unaffected by weather or age, so that the cover permanently remains neat and attractive.

Figure 1:
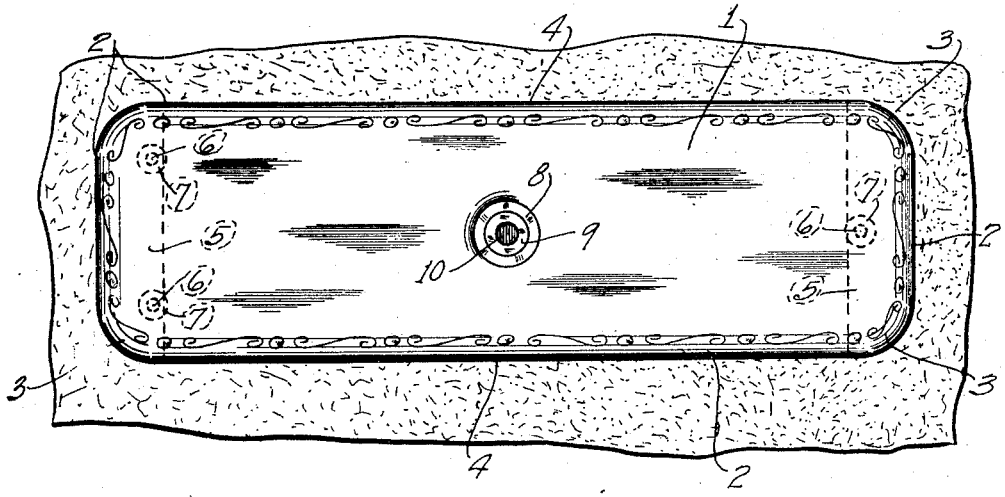
Fig. 1 is a plan view.
Figure 2:
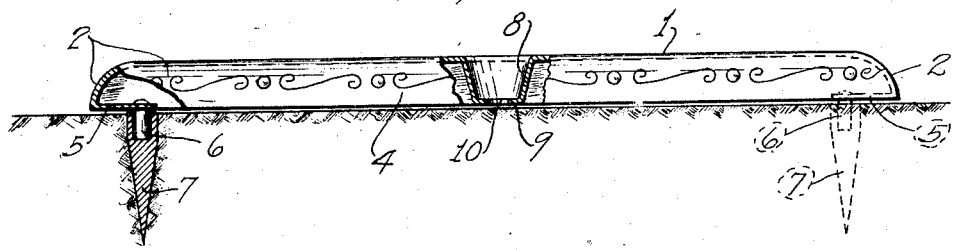
Fig. 2 is a side elevation, partly broken away.

As shown in Fig. 1 my improved grave cover consists of a plain rectangular surface 1, having its marginal edges 2 of all four sides turned downwardly, substantially at right-angles to the plain surface 1, and slightly rounded at the corners 3. The longitudinal edges 4 present a straight-line edge which is turned downwardly and can be slightly inserted in the soil.

At each end a portion 5 of the metal forming the ends is turned inwardly parallel to the plain surface of the upper side, to provide suitable bearings to which are attached a plurality of standards 6 adapted to engage openings of like contour in a plurality of stakes 7.

Intermediate of the ends and in the lateral center of the cover an opening is provided in which the metal is turned downwardly to form an annular depression 8. At the bottom of the depression 8 a flange 9 is turned inwardly to form a rest or support for a flower pot or vase. The geometrical center of the annular depression 8 is provided with an aperture 10 through which seed or shrubbery may be planted in the ground immediately below.

It is evident that if the stakes 7 are set into the ground at a depth below the frost line and the cover adjusted on top of the stakes, the cover will be unaffected by the upheaval of the frozen earth.

It is well known that a porcelain enamel when properly applied will not discolor with age, nor be deleteriously affected by atmospheric conditions.

It is obvious that when my cover is properly installed, the expense of taking care of a grave will be very greatly reduced and at the same time the grave will present a well cared for appearance after many years.

Having fully described my invention and the method of its construction, what I claim as new and useful and desire to secure by Letters Patent is:

A grave cover of the class described, comprising a metal cover of a size and shape to cover a grave, an annular depression in its transverse center and intermediate its ends, a circumferential flange projecting inwardly about the bottom of said depression leaving an opening in the bottom of said depression, means for supporting said cover in position so that it will not be moved out of place by the freezing and thawing of the earth.

In witness whereof I have hereunto affixed my signature this 19 day of August, 1925.

WALTER BUEL.